(12) United States Patent
Sogabe et al.

(10) Patent No.: US 9,105,296 B2
(45) Date of Patent: Aug. 11, 2015

(54) ELECTRONIC APPARATUS (71) Applicant: SONY COMPUTER ENTERTAINMENT INC., Tokyo (JP)

(72) Inventors: Takashi Sogabe, Tokyo (JP); Yasuhiro Ootori, Kanagawa (JP)

(73) Assignees: SONY CORPORATION, Tokyo (JP); SONY COMPUTER ENTERTAINMENT INC., Tokyo (JP)

( * ) Notice: Subject to any disclaimer, the term of this patent is extended or adjusted under 35 U.S.C. 154(b) by 0 days.

(21) Appl. No.: 14/391,699

(22) PCT Filed: Apr. 5, 2013

(86) PCT No.: PCT/JP2013/060445
§ 371 (c)(1),
(2) Date: Oct. 9, 2014

(87) PCT Pub. No.: WO2013/154041
PCT Pub. Date: Oct. 17, 2013

(65) Prior Publication Data
US 2015/0082327 A1    Mar. 19, 2015

(30) Foreign Application Priority Data
Apr. 13, 2012   (JP) ................................ 2012-092502

(51) Int. Cl.
*G11B 33/02*   (2006.01)
*G11B 17/04*   (2006.01)

(52) U.S. Cl.
CPC .......... *G11B 17/0405* (2013.01); *G11B 33/022* (2013.01); *G11B 33/027* (2013.01)

(58) Field of Classification Search
CPC ................................ G11B 33/02; G11B 5/33
USPC ................. 720/647, 650, 652, 646, 654, 659
See application file for complete search history.

(56) References Cited

U.S. PATENT DOCUMENTS 6,400,668 B1 *  6/2002  Chen ........................... 720/646
7,687,711 B2    3/2010  Kutaragi et al.
(Continued)

FOREIGN PATENT DOCUMENTS

| JP | H08-007428 A   | 1/1996 |
| JP | 2000-123561 A  | 4/2000 |

(Continued)

OTHER PUBLICATIONS

English Translation of Written Opinion of the International Searching Authority for PCT/JP2013/060445 accompanied with PCT/IB/373 dated Oct. 14, 2014 acting as concise explanation of previously submitted reference(s).

(Continued)

*Primary Examiner* — Allen T Cao
(74) *Attorney, Agent, or Firm* — Hubbs, Enatsky & Inoue PLLC (57) ABSTRACT

A slide cover is curved such that a central portion thereof in a front and rear direction is positioned higher than a front edge and a rear edge thereof. A disk accommodation section in which an optical disk is to be disposed is covered with the slide cover which is positioned at a closed position. A rotational driving portion configured to be fitted in a center hole of the optical disk to rotate the optical disk is provided on the disk accommodation section. With this electronic apparatus, the cost can be reduced, and an installation operation of an optical disk by a user can be facilitated.

10 Claims, 9 Drawing Sheets

(56) References Cited

U.S. PATENT DOCUMENTS

| | | |
|---|---|---|
| 8,136,130 B2 * | 3/2012 | De Zhang .................... 720/647 |
| 2004/0047617 A1 * | 3/2004 | Matos ......................... 386/125 |
| 2004/0062171 A1 * | 4/2004 | Huang ........................ 369/75.1 |
| 2004/0255314 A1 * | 12/2004 | Abe et al. ...................... 720/656 |

FOREIGN PATENT DOCUMENTS

| | | | |
|---|---|---|---|
| JP | 2005-078733 A | 3/2005 | |
| JP | 2007-095174 A | 4/2007 | |

OTHER PUBLICATIONS

International Search Report for PCT/JP2013/060445 dated Jul. 2, 2013.

Partial Translation of the Office Action for Japanese Patent Application No. 2014-510146 dated Feb. 17, 2015.

* cited by examiner

ELECTRONIC APPARATUS

CROSS REFERENCE TO RELATED APPLICATIONS

This application is a National Stage of International Application No. PCT/JP2013/060445 filed Apr. 5, 2013, claiming priority based on Japanese Patent Application No. 2012-092502 filed on Apr. 13, 2012. The contents of each of the above documents are incorporated herein by reference in their entirety.

TECHNICAL FIELD

The present invention relates to an electronic apparatus on which an optical disk can be utilized.

BACKGROUND ART

Conventionally, an electronic apparatus which reproduces data recorded on an optical disk or executes a program stored in an optical disk is utilized (for example, U.S. Pat. No. 7,687,711). In the electronic apparatus of Patent Document 1, a slot for inserting an optical disk is provided.

SUMMARY

An electronic apparatus having a slot needs, in the inside thereof, a loading mechanism for transporting an optical disk inserted in the slot into the electronic apparatus. Such a mechanism as just described includes a comparatively expensive part, which causes increase of the cost of the electronic apparatus.

According to an embodiment of the present invention, an electronic apparatus includes an upper face curved over a range from a front edge to a rear edge thereof such that a central portion thereof in a front and rear direction may be positioned higher than the front edge and the rear edge. The apparatus further includes a slide cover which configures part of the upper face. The slide cover is curved in accordance with the upper face such that a central portion thereof in the front and rear direction may be positioned higher than a front edge and a rear edge thereof. The slide cover is slidably movable between an open position and a closed position. The apparatus further includes a disk accommodation section covered with the slide cover which is at the closed position and configured such that an optical disk is disposed therein. The apparatus further includes a rotational driving section provided on the disk accommodation section and configured to be fitted in a center hole of the optical disk to rotate the optical disk.

With the electronic apparatus described above, since a loading mechanism is not required, reduction of the cost can be anticipated. Further, since the cover which covers the disk accommodation section is curved, the height of the rotational driving portion can be increased. As a result, an installation operation of an optical disk by the user can be facilitated.

DESCRIPTION OF EMBODIMENTS

Figure 1:
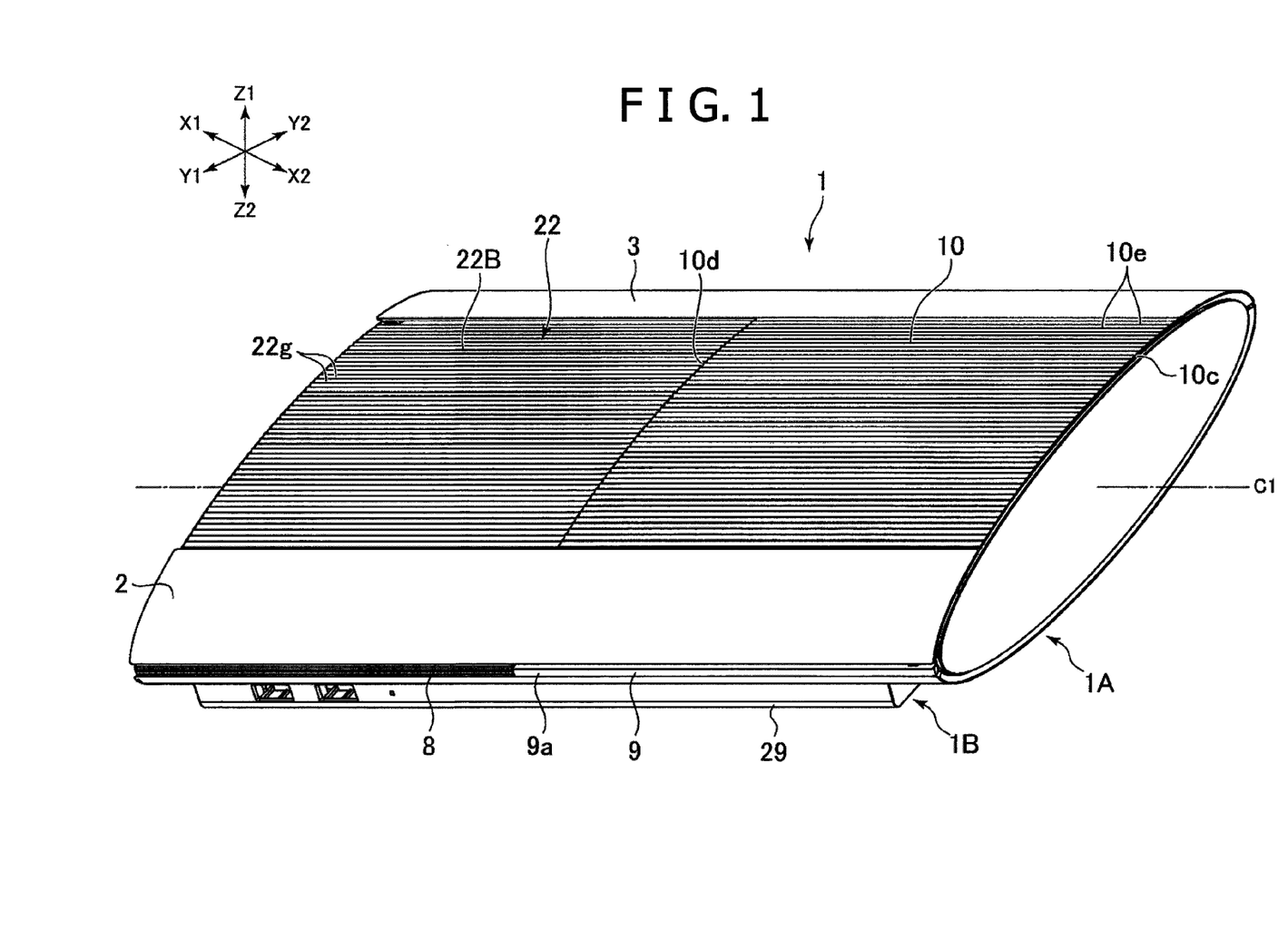
FIG. 1 is a perspective view of an electronic apparatus according to an embodiment of the present invention. In this figure, a slide cover is disposed at a closed position.
Figure 2:
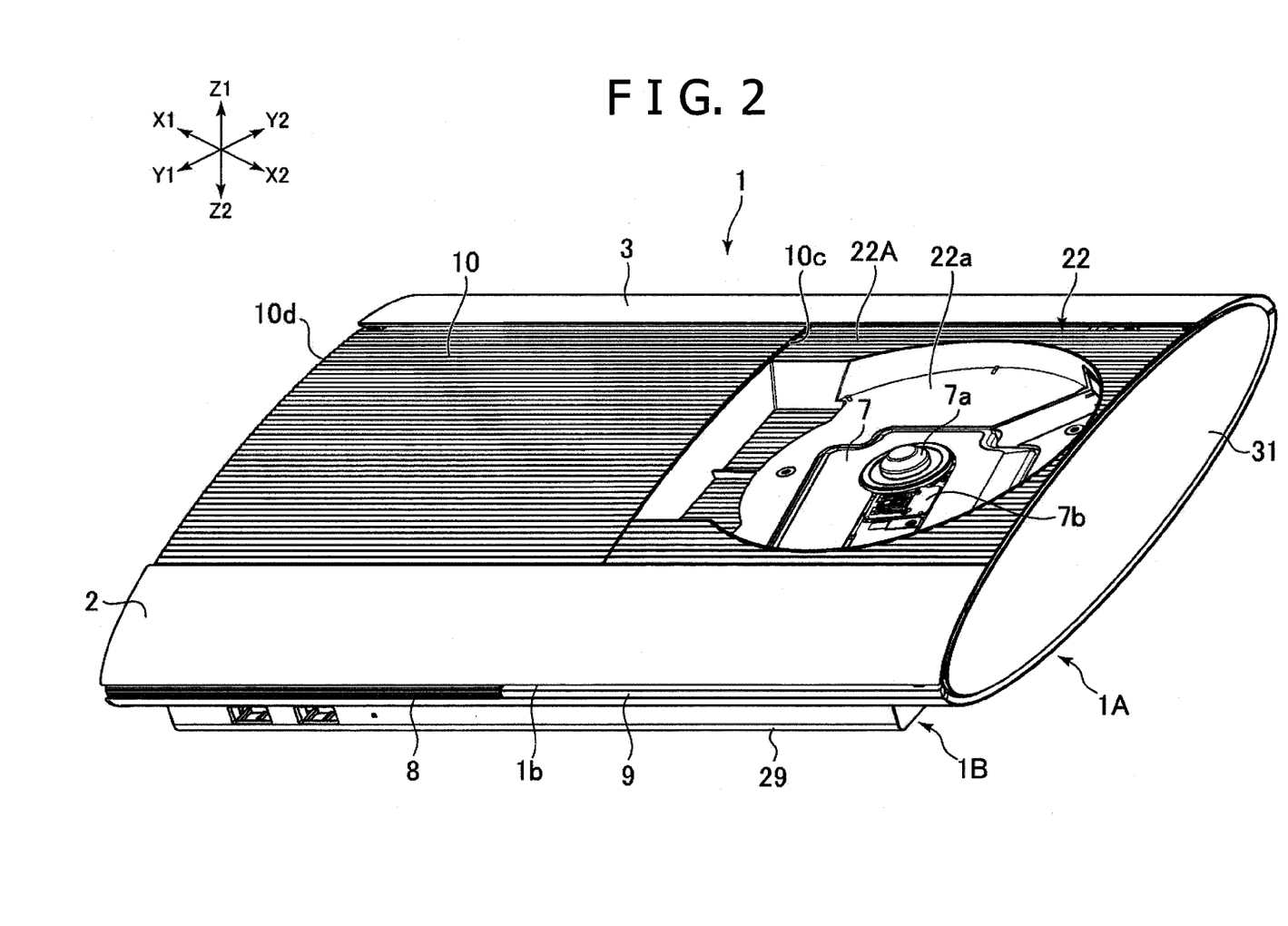
FIG. 2 is a perspective view of the electronic apparatus according to the embodiment of the present invention. In this figure, the slide cover is disposed at an open position.
Figure 3:
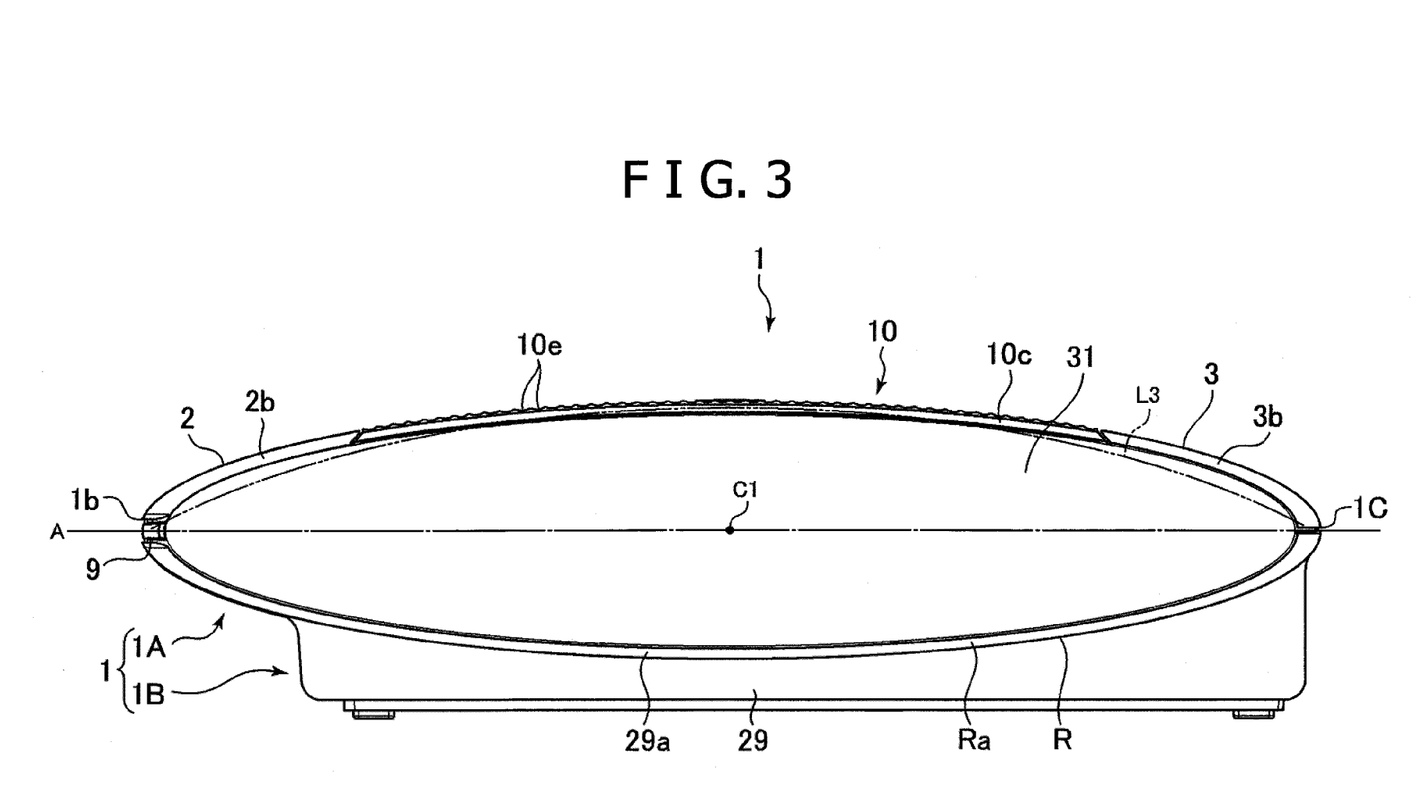
FIG. 3 is a side elevational view of the electronic apparatus.
Figure 4:
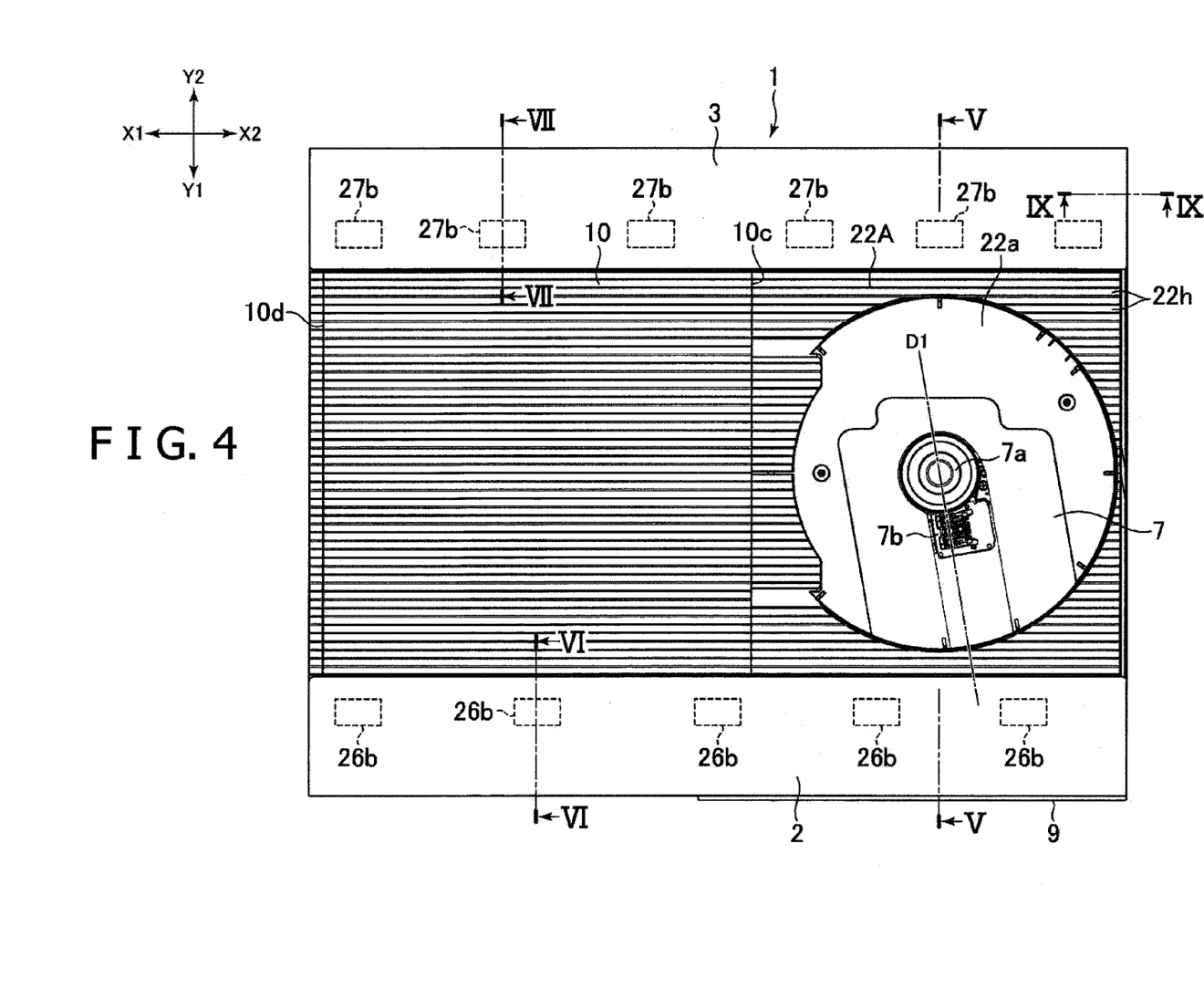
FIG. 4 is a top plan view of the electronic apparatus.
Figure 5:
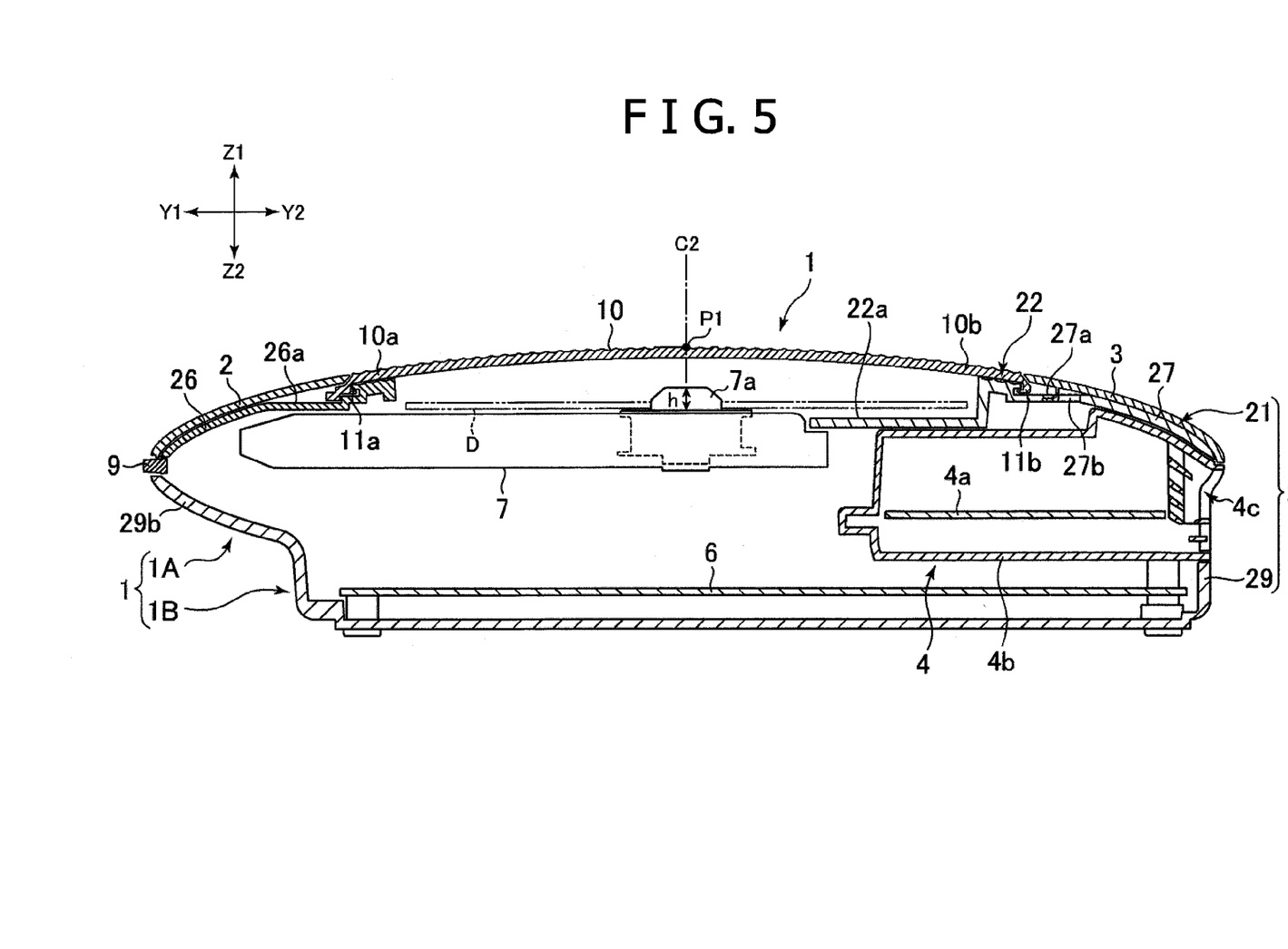
FIG. 5 is a sectional view taken along line V-V shown in FIG. 4 and illustrating a state in which the slide cover is disposed at the closed position.
Figure 6:
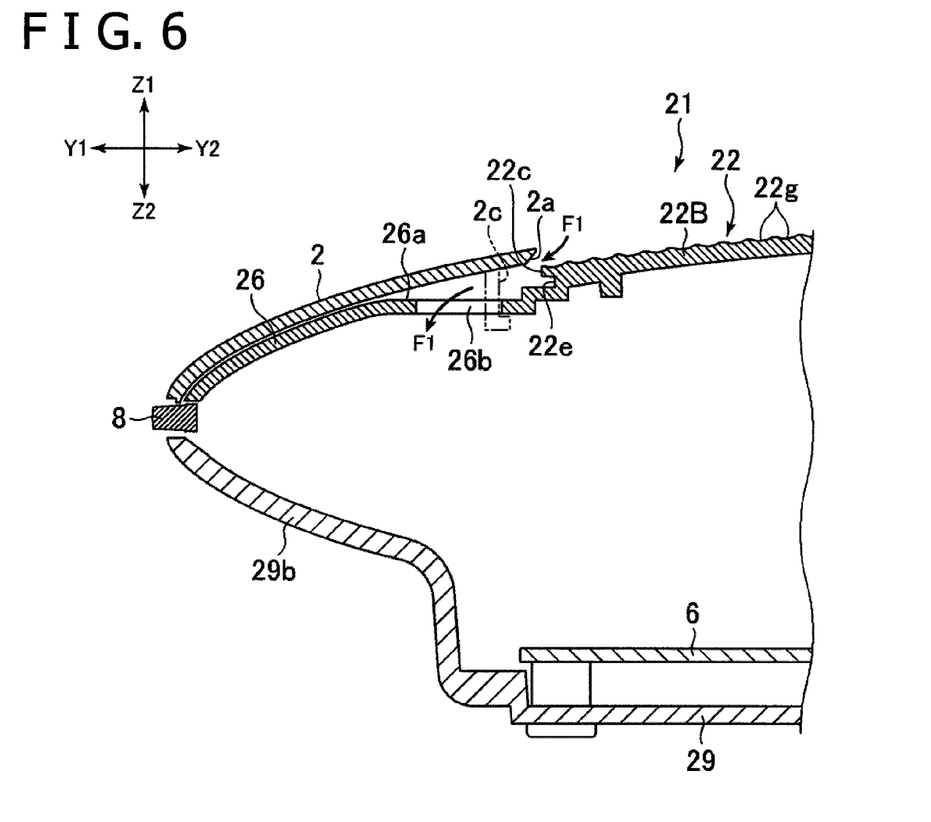
FIG. 6 is a sectional view taken along line VI-VI shown in FIG. 4 and illustrating a state in which the slide cover is disposed at the closed position.
Figure 7:
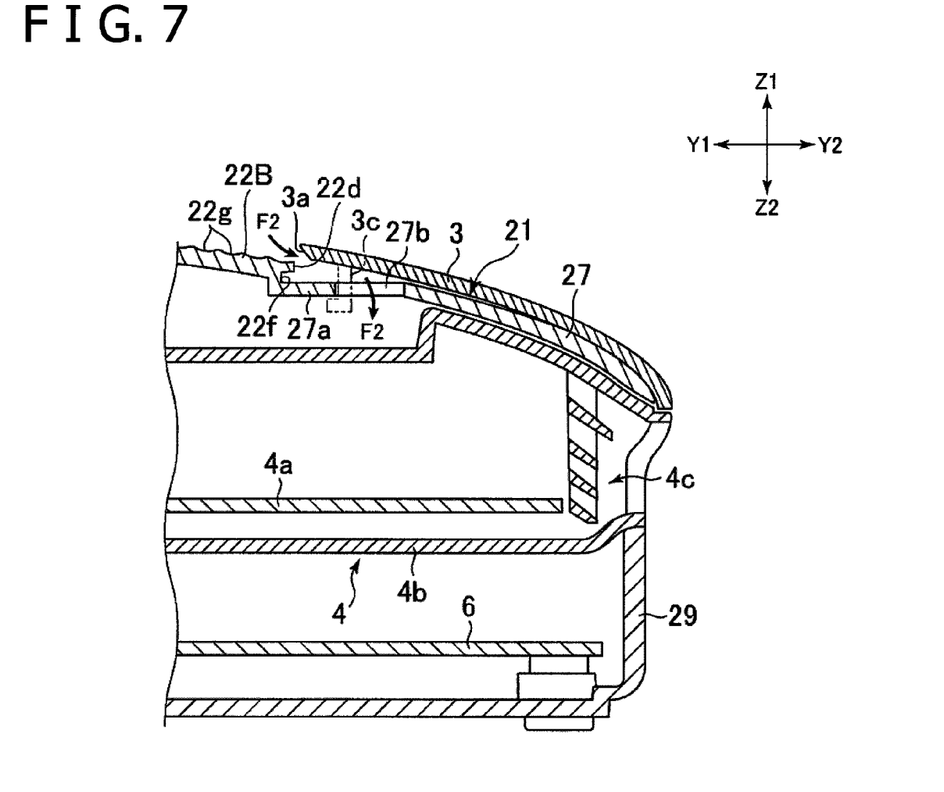
FIG. 7 is a sectional view taken along line VII-VII shown in FIG. 4 and illustrating a state in which the slide cover is disposed at the closed position.

In the following, an embodiment of the present invention is described. FIGS. 1 and 2 are perspective views of an electronic apparatus 1 according to an embodiment of the present invention. The electronic apparatus 1 includes a slide cover 10. In FIG. 1, the slide cover 10 is disposed at a closed position, and in FIG. 2, the slide cover 10 is disposed at an open position. FIG. 3 is a side elevational view of the electronic apparatus 1. FIG. 4 is a top plan view of the electronic apparatus 1. In FIG. 4, the slide cover 10 is disposed at the open position. FIG. 5 is a sectional view taken along line V-V shown in FIG. 4 and illustrating a state in which the slide cover 10 is disposed at the closed position. FIG. 6 is a sectional view taken along line VI-VI shown in FIG. 4 and illustrating a state in which the slide cover 10 is disposed at the closed position. FIG. 7 is a sectional view taken along line VII-VII shown in FIG. 4 and illustrating a state in which the slide cover 10 is disposed at the closed position. In the following description, directions denoted by X1 and X2 in the figures are defined as a leftward direction and a rightward direction, respectively; directions denoted by Y1 and Y2 are defined as a front direction and a rear direction, respectively; and directions indicated by Z1 and Z2 are defined as an upward direction and a downward direction, respectively.

As shown in FIG. 1, the electronic apparatus 1 has, on an upper face thereof, the slide cover 10, and a second side portion 22B which a front panel 2, a rear panel 3 and a housing 20 have. As shown in FIG. 3, the upper face of the electronic apparatus 1 is curved such that a central portion thereof in the front and rear direction is positioned higher than a front edge 1b and a rear edge 1c thereof. The upper face of the electronic apparatus 1 is curved over a region from the front edge 1b to the rear edge 1c. That is, the upper face of the electronic apparatus 1 is curved over the entire region from the front edge 1b to the rear edge 1c. The electronic apparatus 1 of the present example has an upper part 1A of a substantially elliptically cylindrical shape having an axial line C1 (refer to FIG. 1) along the leftward and rightward direction. Side faces of the upper part 1A of the electronic apparatus 1 have an elliptical shape and have a major axis A. In the present example, a plane including the major axis A and the axial line C1 extends horizontally. In other words, the plane including the major axis A and the axial line C1 extends in parallel to a bottom face of the electronic apparatus 1 (particularly the bottom face of a lower part 1B hereinafter described). The upper face of the electronic apparatus 1 configures a portion of an outer peripheral face of the elliptic cylinder on the upper side than the plane including the major axis A and the axial line C1.

The electronic apparatus 1 of the present example has a box-shaped lower part 1B. As shown in FIG. 3, a front portion of the upper part 1A projects forwardly farther than a front face of the lower part 1B. Further, the lower part 1B is offset to one side in one of the rightward direction and the leftward direction from the upper part 1A. In the present example, the lower part 1B is offset in the leftward direction from the upper part 1A. The position of the left side face of the lower part 1B in the leftward and rightward direction coincides with the position of the left side face of the upper part 1A. Further, the electronic apparatus 1 can be used in an upwardly erected state with the left side faces of the upper part 1A and the lower part 1B positioned on the lower side. A right side portion of the upper part 1A projects in the rightward direction farther than the right side face of the lower part 1B.

The electronic apparatus 1 has the housing 20 for accommodating parts and devices provided in the electronic apparatus 1. In FIG. 5, a circuit board 6 and a power supply unit 4 are shown as an example of the parts and the devices. The power supply unit 4 in the present example has a circuit board 4a and a case 4b which accommodates the circuit board 4a therein. An exhaust port 4c is formed in the case 4b. The exhaust port 4c is exposed from an opening formed in a rear wall of the housing 20.

The housing 20 has an upper housing 21 and a lower housing 29 which are assembled to each other in the upward and downward direction. The electronic apparatus 1 is an entertainment apparatus which executes a program stored in an optical disk D or reproduces moving images or sound stored in the optical disk D. A disk accommodation section 22a in the form of a recessed portion for accommodating the optical disk D therein is formed on the upper housing 21. A disk drive 7 is disposed on the bottom of the disk accommodation section 22a. The disk drive 7 has a rotational driving portion 7a for being fitted in a center hole of the optical disk D to rotate the optical disk D. The rotational driving portion 7a is rotated by a spindle motor provided in the disk drive 7. A chucking mechanism (not shown) having a pawl portion configured to hook an inner circumference of the center hole of the optical disk D for fixing the optical disk D to the rotational driving portion 7a is provided in the rotational driving portion 7a. Further, the disk drive 7 has a pickup unit 7b for irradiating light upon the optical disk D to read data recorded on the optical disk D (refer to FIG. 2).

The slide cover 10 is slidably movable in the leftward and rightward direction between the closed position (FIG. 1) at which it covers the disk accommodation section 22a and the open position (FIG. 2) at which it exposes the disk accommodation section 22a. The slide cover 10 is curved in accordance with the upper face of the electronic apparatus 1 described above. In other words, the slide cover 10 is curved such that a central portion thereof in the front and rear direction is positioned higher than the front edge and the rear edge thereof. With the slide cover 10 configured in such a manner as described above, it is easy to assure the distance between the bottom of the disk accommodation section 22a and the slide cover 10 in comparison with that in an alternative case in which the slide cover 10 is formed otherwise as a flat plate. As a result, it is possible to increase the height h (refer to FIG. 5) of the rotational driving portion 7a, and an operation of a user in fitting the optical disk D with the rotational driving portion 7a or removing the optical disk D from the rotational driving portion 7a can be facilitated.

As shown in FIG. 5, the rotational driving portion 7a is positioned below the top P1 which is the highest position of the slide cover 10. In the present example, the top P1 of the slide cover 10 coincides with the top of the upper face of the electronic apparatus 1. The rotational driving portion 7a is positioned below the top P1. In other words, the center line C2 of the rotational driving portion 7a passes the top P1. Therefore, the height of the rotational driving portion 7a can be increased more readily. Further, the degree of freedom of the structure of the chucking mechanism provided in the rotational driving portion 7a can be increased.

The top of the upper face of the electronic apparatus 1 is positioned at a central portion of the upper face in the front and rear direction. In the present example, therefore, the rotational driving portion 7a is positioned at a central portion of the electronic apparatus 1 in the front and rear direction. As shown in FIG. 4, the disk drive 7 is disposed obliquely with respect to the front and rear direction. In particular, the longitudinal direction D1 of the disk drive 7 is inclined with respect to the front and rear direction of the electronic apparatus 1. By such disposition of the disk drive 7 as just described, the width of the electronic apparatus 1 in the front and rear direction can be reduced while the rotational driving portion 7a is positioned at a central portion of the electronic apparatus 1 in the front and rear direction.

As described hereinabove, the electronic apparatus 1 has, as members which configure the upper face thereof, the panel 2 (hereinafter referred to as front panel) positioned on one side (in the present example, on the front side) of the slide cover 10 and the panel 3 (hereinafter referred to as rear panel) positioned on the other side (in the present example, on the rear side) of the slide cover 10. The slide cover 10 is slidably movable between the front panel 2 and the rear panel 3. As shown in FIG. 3, the front panel 2 configures a front portion of the upper face of the electronic apparatus 1, and the rear panel 3 configures a rear portion of the upper face of the electronic apparatus 1. The panels 2 and 3 are curved such that the upper face of the electronic apparatus 1 may form an outer peripheral face of the elliptical cylinder described hereinabove. The width of the two panels 2 and 3 in the leftward and rightward direction coincides with the width of the electronic apparatus 1.

As shown in FIG. 5, a front portion 29b of the lower housing 29 projects forwardly farther than the lower part 1B of the electronic apparatus 1 and configures a lower face of the upper part 1A of the electronic apparatus 1. The front portion of the lower housing 29 is curved such that it configures a front portion of an outer peripheral face of the upper part 1A of an elliptically cylindrical shape. In other words, the front portion 29b of the lower housing 29 is curved so as to be directed forwardly and upwardly. In the present example, two front bars 8 and 9 juxtaposed with each other in the leftward and rightward direction are disposed between a front edge of the lower housing 29 and a front edge of the front panel 2 (refer to FIG. 1).

As shown in FIGS. 1 and 2, the slide cover 10 is disposed between the front panel 2 and the rear panel 3 and slidably movable in the leftward and rightward direction between the front panel 2 and the rear panel 3. The slide cover 10 in the present example is a cover which can be manually opened and closed by the user. In particular, the user can push the slide cover 10 toward the open position or the closed position to open or close the slide cover 10. With the structure of the present embodiment wherein the front panel 2 and the rear panel 3 are disposed on the front side and the rear side of the slide cover 10, respectively, when the user opens or closes the slide cover 10, it can be prevented that the user pushes a front portion or a rear portion of the upper face of the electronic apparatus 1. Therefore, the posture of the electronic apparatus 1 can be prevented from being changed by a moment which is generated on the electronic apparatus 1 when the slide cover 10 is opened or closed. It is to be noted that a button for opening the slide cover 10 is provided at a frontmost portion of the electronic apparatus 1 of the present example. In the present example, an end portion 9a of the front bar 9 functions as the button. Also by an operation of this button, the user can open the slide cover 10.

The slide cover 10 is positioned on one end side from between the right side and the left side of the upper face of the electronic apparatus 1 when it is at the closed position. In the present example, the slide cover 10 is positioned on the right side of the upper face of the electronic apparatus 1 when it is at the closed position as shown in FIG. 1. A right edge 10c of the slide cover 10 is positioned at a right end portion of the electronic apparatus 1 when the slide cover 10 is at the closed position. Therefore, the user can hook the right edge 10c of the slide cover 10 by a finger thereof to move the slide cover 10 to the open position. As shown in FIG. 3, the electronic apparatus 1 of the present example has a side panel 31 hereinafter described in detail. The right edge 10c of the slide cover 10 is positioned on the upper side of an outer peripheral edge of the side panel 31 and is curved along the outer peripheral edge of the side panel 31.

The slide cover 10 is positioned on the other side from between the right side and the left side of the upper face of the electronic apparatus 1 when it is at the open position. In the present example, the slide cover 10 is positioned on the left side of the upper face when it is at the open position as shown in FIG. 4. A left edge 10d of the slide cover 10 is positioned on the right side with respect to the left end portion of the electronic apparatus 1 when the slide cover 10 is at the open position. As described hereinabove, the electronic apparatus 1 can be used in an uprightly erected state with the left side face thereof positioned on the lower side. When the slide cover 10 is at the open position, the left edge 10d thereof is positioned on the right side with respect to the left end portion of the electronic apparatus 1. Therefore, when the slide cover 10 is opened in a state in which the electronic apparatus 1 is erected, the left edge 10d of the slide cover 10 can be prevented from hitting a face on which the electronic apparatus 1 is placed.

As shown in FIGS. 1 and 2, the upper housing 21 has an upper panel section 22. The upper panel section 22 is positioned between the front panel 2 and the rear panel 3. The slide cover 10 is slidably movable in the leftward and rightward direction on the upper side of the upper panel section 22. The upper panel section 22 has, at one of a right portion and a left portion thereof, a first side portion 22A on which the disk accommodation section 22a described hereinabove is formed (refer to FIG. 2). The first side portion 22A is covered with the slide cover 10 when the slide cover 10 is at the closed position. The upper panel section 22 has, at the other one of the right portion and the left portion thereof, a second side portion 22B (refer to FIG. 1). The upper panel section 22 in the present example has the first side portion 22A at the right portion thereof and has the second side portion 22B at the left portion thereof. The second side portion 22B is in the form of a plate and configures the upper face of the electronic apparatus 1 together with the slide cover 10. When the slide cover 10 is at the open position, the second side portion 22B is covered with the slide cover 10.

As shown in FIG. 5, the slide cover 10 lies in flush with the front panel 2. In particular, a front portion 10a of the slide cover 10 and a rear edge of the front panel 2 are positioned on a substantially same plane and are moderately contiguous to each other. Similarly, the slide cover 10 is disposed so as to be in flush with the rear panel 3. In particular, a rear portion 10b of the slide cover 10 and a front edge of the rear panel 3 are positioned on a substantially same plane and are moderately contiguous to each other.

As shown in FIGS. 6 and 7, a front edge 22c of the upper panel section 22 of the upper housing 21 is positioned below the rear edge of the front panel 2. Further, a rear edge 22d of the upper panel section 22 of the upper housing 21 is positioned below the front edge of the rear panel 3. Consequently, at whichever one of the closed position and the open position the slide cover 10 is positioned, the slide cover 10 and the panels 2 and 3 can be disposed in flush with each other. A gap is provided between the front edge 22c of the upper panel section 22 and the rear edge of the front panel 2, and a gap is provided also between the rear edge 22d of the upper panel section 22 and the front edge of the rear panel 3. In the gaps, a frontmost portion of the slide cover 10 (particularly a portion at which a front guided portion 11a hereinafter described is formed) and a rearmost portion of the slide cover 10 (particularly a portion at which a rear guided portion 11b hereinafter described is formed) are fitted.

The above-described second side portion 22B of the upper panel section 22 is curved such that the upper face of the electronic apparatus 1 forms an outer peripheral face of the elliptical cylinder described hereinabove. In particular, the second side portion 22B is curved in accordance with the slide cover 10 such that a central portion thereof in the front and rear direction is positioned higher than the front edge and the rear edge thereof. Where the second side portion 22B is curved so as to swell upwardly in this manner, the capacity of the housing 20 can be prevented from being reduced. Further, since the second side portion 22B is curved in accordance with the slide cover 10, a situation that the depression between the front edge of the second side portion 22B (namely, the front edge 22c of the upper panel section 22) and the rear edge of the second side portion 22B (namely, the rear edge 22d of the upper panel section 22) stands out arising from the fact that the front edge of the second side portion 22B and the rear edge of the second side portion 22B are positioned lower than the edges of the panels 2 and 3 can be prevented. As a result, the uniformity in design of the upper face of the electronic apparatus 1 can be anticipated.

As shown in FIG. 6, the front panel 2 has, on a rear edge thereof, an inclined face 2a directed obliquely rearwardly and downwardly. In particular, the end face of the front panel 2 positioned on the upper panel section 22 side is directed obliquely rearwardly and downwardly. As a result, when the user looks at the electronic apparatus 1, the end face of the front panel 2 looks less likely to stand out. Therefore, the fact that the front edge of the second side portion 22B is positioned lower than the rear edge of the front panel 2 is less likely to stand out.

As shown in FIG. 7, the rear panel 3 has, on a front edge thereof, an inclined face 3a directed obliquely forwardly and downwardly. In particular, the end face of the rear panel 3 on the upper panel section 22 side is directed obliquely forwardly and downwardly. As a result, when the user looks at the electronic apparatus 1, the end face of the rear panel 3 looks less likely to stand out. Therefore, the fact that the rear edge of the second side portion 22B is positioned lower than the front edge of the rear panel 3 is less likely to stand out.

As shown in FIGS. 5 and 6, the upper housing 21 has, at a front portion thereof, a front inner panel portion 26 extending forwardly from the upper panel section 22. The front panel 2 is attached to an upper face of the front inner panel portion 26. The front inner panel portion 26 is curved in accordance with the front panel 2, and the front portion of the electronic apparatus 1 has a dual structure configured from the front panel 2 and the front inner panel portion 26. Consequently, the strength of the front portion of the electronic apparatus 1 against external force acting from an obliquely upper side can be increased.

As shown in FIG. 7, the upper housing 21 has, at a rear portion thereof, a rear inner panel portion 27 extending rearwardly from the upper panel section 22. The rear panel 3 is attached to an upper face of the rear inner panel portion 27. The rear inner panel portion 27 is curved in accordance with the rear panel 3, and the rear portion of the electronic apparatus 1 has a dual structure configured from the rear panel 3 and the rear inner panel portion 27. Consequently, the strength of the rear portion of the electronic apparatus 1 against external force acting from an obliquely upper side can be increased.

As described hereinabove, the front panel 2 and the rear panel 3 are curved such that the upper face of the electronic apparatus 1 configures an outer peripheral face of the elliptical cylinder. Further, the front inner panel portion 26 and the rear inner panel portion 27 are curved in accordance with the front panel 2 and the rear panel 3, respectively. Consequently, decrease of the capacity of the housing 20 can be prevented. In particular, as a form in which the upper face of the electronic apparatus 1 is curved, a form in which the upper face is curved in an arc which passes the top P1 of the upper face, the front edge 1b of the upper face and the rear edge 1c of the upper face seems applicable as shown by an alternate long and two short dashes line L3 in FIG. 3, for example. Where the upper face of the electronic apparatus 1 (particularly the front panel 2 and the rear panel 3) is curved so as to configure an outer peripheral face of the elliptical cylinder, the front portion and the rear portion of the upper face of the electronic apparatus 1 swell from the alternate long and two short dashes line L3 as shown in FIG. 3. As a result, decrease of the capacity at the front portion and the rear portion of the housing 20 is prevented.

The front inner panel portion 26 has a portion which cooperates with the front panel 2 to define a gap therebetween. In the present example, the front inner panel portion 26 has a flattened rear portion 26a and a gap is formed between the rear portion 26a and the front panel 2 as shown in FIG. 6. A vent hole 26b connected to the inner side of the housing 20 is formed in the rear portion 26a. In the present example, a plurality of vent holes 26b juxtaposed in the leftward and rightward direction are formed in the rear portion 26a (refer to FIG. 4). As described hereinabove, a gap is formed between the rear edge of the front panel 2 and the upper panel section 22. A cooling fan (not shown) for cooling electronic parts mounted on the circuit board 6 is disposed on the inner side of the housing 2. When the cooling fan is driven, an air flow F1 which flows through the gap between the rear edge of the front panel 2 and the upper panel section 22 and through the vent holes 26b is formed. In the present example, the air flow F1 flows through the gap between the rear edge of the front panel 2 and the upper panel section 22 and through the vent holes 26b toward the inside of the housing 20. As described hereinabove, the front panel 2 has the inclined face 2a on the rear edge thereof. Therefore, smoothing of the air flow F1 can be anticipated. It is to be noted that the vent holes 26b function also as attaching holes for the front panel 2. In particular, an engaging portion 2c is formed on a lower face of the front panel 2 and is hooked by an edge of the vent holes 26b.

The rear inner panel portion 27 has a portion which cooperates with the rear panel 3 to form a gap therebetween. In the present example, the rear inner panel portion 27 has a flattened front portion 27a and a gap is formed between the front portion 27a and the rear panel 3 as shown in FIG. 7. A vent hole 27b connected to the inner side of the housing 20 is formed in the front portion 27a. In the front portion 27a of the present example, a plurality of vent holes 27b juxtaposed in the leftward and rightward direction are formed (refer to FIG. 4). As described hereinabove, a gap is formed between the front edge of the rear panel 3 and the upper panel section 22. When the cooling fan described above is driven, an air flow F2 which flows through the gap between the front edge of the rear panel 3 and the upper panel section 22 and through the vent holes 27b is formed. In particular, in the present example, the air flow F2 flows through the gap between the front edge of the rear panel 3 and the upper panel section 22 and through the vent holes 27b toward the inner side of the housing 20. As described hereinabove, the rear panel 3 has the inclined face 3a on the front edge thereof. Therefore, smoothing of the air flow F3 can be anticipated. It is to be noted that also the vent holes 27b function as attaching holes for the rear panel 3 similarly to the vent holes 26b. In particular, an engaging portion 3c is formed on a lower face of the rear panel 3 and is hooked by the vent holes 27b.

As described hereinabove, the slide cover 10 is slidably movable in the leftward and rightward direction on the upper side of the upper panel section 22. Further, the slide cover 10 is curved such that a central portion thereof in the front and rear direction is positioned higher than the front edge and the rear edge thereof. Therefore, when an operation for attaching the slide cover 10 to the upper panel section 22 is carried out, a worker can expand the distance between the front edge and the rear edge of the slide cover 10 by curving the slide cover 10 to the opposite side. The frontmost portion (front guided portion 11a hereinafter described) and the rearmost portion (rear guided portion 11b hereinafter described) of the slide cover 10 are curved toward the central portion of the slide cover 10 in the front and rear direction such that they catch hold of the front edge and the rear edge of the upper panel section 22 (refer to FIG. 5). With such an attachment structure of the slide cover 10 as just described, the worker who carries out an attachment operation can attach the slide cover 10 to the upper panel section 22 by curving the slide cover 10 so that the distance between the front edge and the rear edge of the slide cover 10 may be expanded.

A front guide portion 22e formed along the front panel 2 to guide the slide cover 10 is provided on the upper face of the electronic apparatus 1. In the present example, the front guide portion 22e is formed on a front edge of the upper panel section 22 as shown in FIG. 6 and guides the slide cover 10 in the leftward and rightward direction. Further, a rear guide portion 22f formed along the rear panel 3 to guide the slide cover 10 is provided on the upper face of the electronic apparatus 1. In the present example, the rear guide portion 22f is formed on a rear edge of the upper panel section 22 as shown in FIG. 7 and guides the slide cover 10 in the leftward and rightward direction. The slide cover 10 has, on the front edge thereof, the front guided portion 11a for engaging with the front guide portion 22e as shown in FIG. 5. Further, the slide cover 10 has, on the rear edge thereof, the rear guided portion 11b for engaging with the rear guide portion 22f. The front guided portion 11a and the rear guided portion 11b project toward a central portion of the slide cover 10 in the front and rear direction. The front guide portion 22e of the upper panel section 22 is a groove in which the front guided portion 11a is fitted, and the rear guide portion 22f is a groove in which the rear guided portion 11b is fitted. The slide cover 10 grasps the upper panel section 22 by the front guided portion 11a and the rear guided portion 11b thereof.

As shown in FIG. 6, a gap is formed between the rear edge of the front panel 2 and the front edge 22c of the upper panel section 22. The frontmost portion of the slide cover 10 extends to the lower side of the rearmost portion of the front panel 2 through the gap (refer to FIG. 5). In other words, the front panel 2 covers the frontmost portion of the slide cover 10. The slide cover 10 has the guided portion 11a described hereinabove at a portion thereof which is positioned on the lower side of the front panel 2. Accordingly, the guide mechanism of the slide cover 10 (namely, the guided portion 11a and the guide portion 22c described hereinabove) can be protected by the front panel 2, and smooth sliding movement can be implemented readily. Further, exposure of the guide mechanism can be prevented. Specifically, in the present example, the front panel 2 has the inclined face 2a on the rear edge thereof. Therefore, while the gap between the front panel 2 and the front edge 22c of the upper panel section 22 is assured, a region in which the front panel 2 and the slide cover 10 overlap with each other, namely, a range within which the slide cover 10 can be protected by the front panel 2, can be expanded.

As shown in FIG. 7, a gap is formed also between the front edge of the rear panel 3 and the rear edge 22d of the upper panel section 22. The rearmost portion of the slide cover 10 extends to the lower side of the frontmost portion of the rear panel 3 through the gap (refer to FIG. 5). In other words, the rear panel 3 covers the rearmost portion of the slide cover 10. The slide cover 10 has the guided portion 11b described hereinabove at a portion thereof which is positioned on the lower side of the rear panel 3. Accordingly, the guide mechanism for the slide cover 10 (namely, the guided portion 11b and the guide portion 22f described hereinabove) can be protected by the rear panel 3, and smooth sliding movement can be implemented readily. Further, exposure of the guide mechanism can be prevented. Specifically, in the present example, the rear panel 3 has the inclined face 3a on the front edge thereof. Therefore, while the gap between the rear panel 3 and the rear edge 22d of the upper panel section 22 is assured, a range within which the slide cover 10 can be protected by the rear panel 2 can be expanded.

As shown in FIGS. 1 and 3, a plurality of grooves 10e are formed on the slide cover 10. Consequently, the strength of the slide cover 10 against external force applied to the slide cover 10 when the user moves the slide cover 10 can be increased. In the present example, the plural grooves 10e extending in the leftward and rightward direction are juxtaposed at equal distances in the front and rear direction. Specifically, in the present example, the grooves 10e are formed on the upper face of the slide cover 10, and the region in which the grooves 10e are formed ranges from the front edge to the rear edge of the slide cover 10.

As described hereinabove, the upper panel section 22 has the second side portion 22B. As shown in FIG. 1, a plurality of grooves 22g are formed also on the second side portion 22B. Consequently, the strength of the upper face of the electronic apparatus 1 can be increased. In the present example, also the grooves 22g extend in the leftward and rightward direction similarly to the grooves 10e of the slide cover 10 and are formed on the upper face of the second side portion 22B. As a result, when the slide cover 10 is slidably moved in the leftward and rightward direction, the lower face of the slide cover 10 contacts with portions between adjacent two grooves 22g. Therefore, even if a trace by movement of the slide cover 10 is formed on the upper face of the second side portion 22B, the trace can be prevented from standing out. In the present example, the region in which the grooves 22g are formed ranges from the front edge to the rear edge of the second side portion 22B. As a result, whichever portion of the upper face of the slide cover 10 is pushed by the user to move the slide cover 10, the trace by the movement can be prevented from standing out. It is to be noted that, in the present example, a plurality of grooves 22h extending in the leftward and rightward direction are formed also on the first side portion 22A as shown in FIG. 4.

Figure 8:
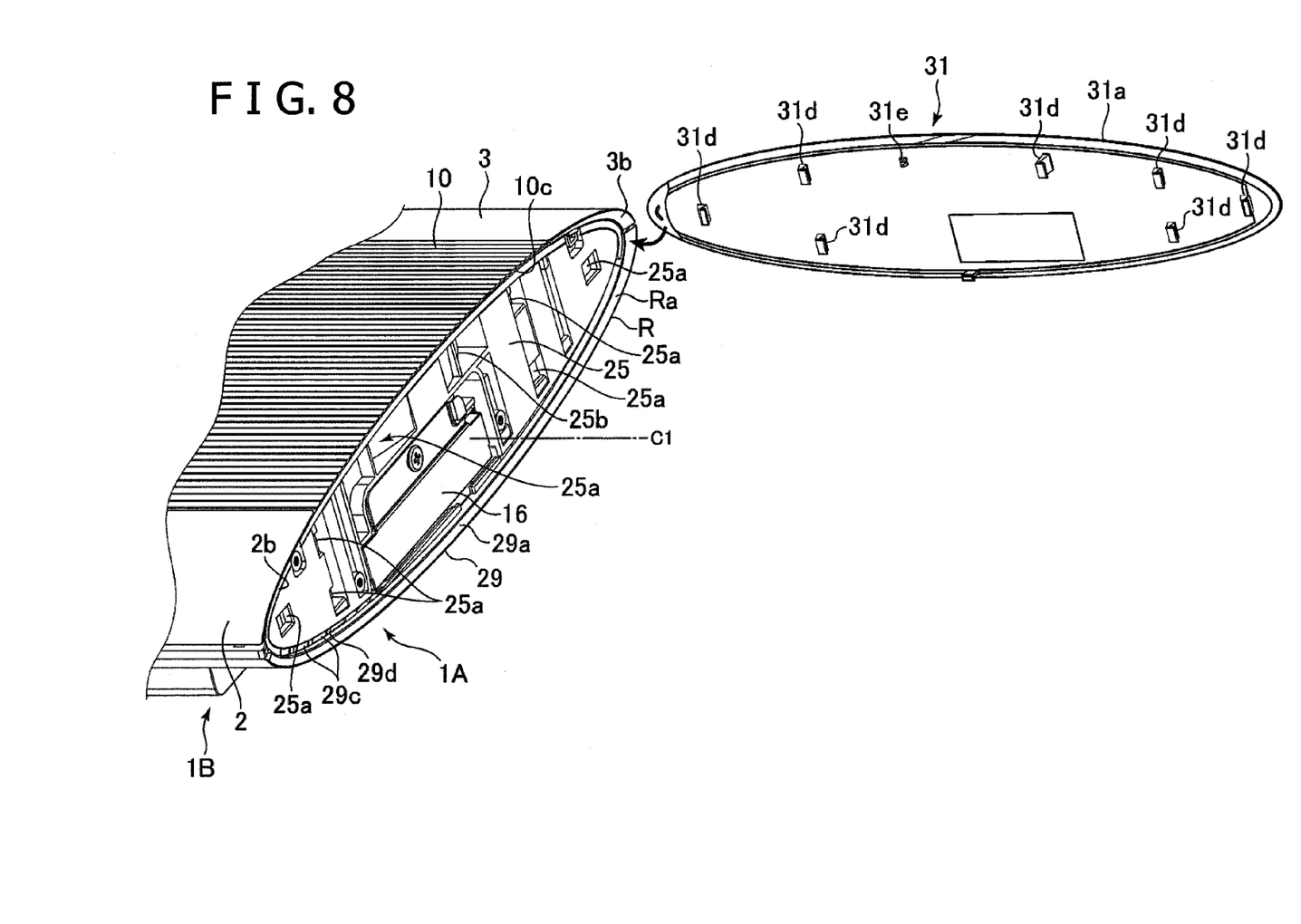
FIG. 8 is a perspective view illustrating a state in which a side panel on the right side is removed.
Figure 9:
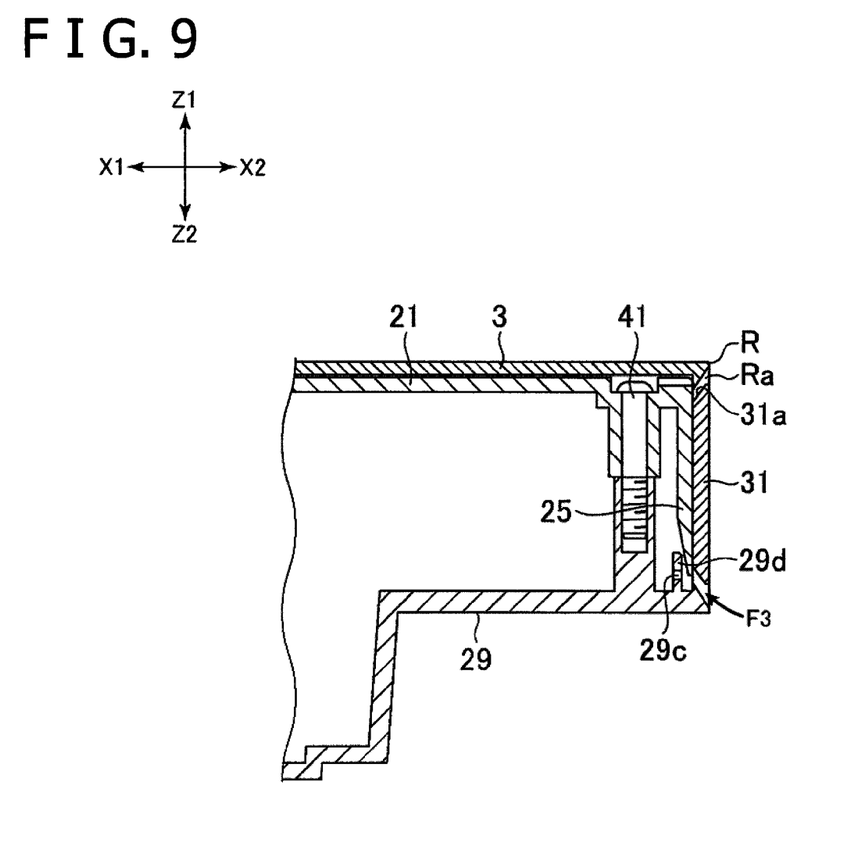
FIG. 9 is a sectional view taken along line IX-IX shown in FIG. 4.

As described hereinabove, the electronic apparatus 1 has the side panels 31 which configure the left and right side faces of the electronic apparatus 1 (refer to FIG. 3). FIG. 8 is a perspective view illustrating a state in which the side panel 31 on the right side is removed. FIG. 9 is a sectional view taken along line IX-IX shown in FIG. 4.

As shown in FIGS. 8 and 9, the housing 20 has a side inner panel portion 25. In the present example, the side inner panel portion 25 is formed on the upper housing 21. The side inner panel portion 25 configures the upper part 1A of the electronic apparatus 1 and has a substantially elliptical shape as viewed in side elevation. The side panel 31 is attached to the side inner panel portion 25, and the side portion of the electronic apparatus 1 has a dual structure configured from the side inner panel portion 25 and the side panel 31. Consequently, the strength of the housing 20 can be increased. Further, in the present example, an opening into which a hard disk apparatus 13 is to be inserted is formed in the side inner panel portion 25 shown in FIG. 8 provided on the right side of the upper housing 21, and the side panel 31 functions also as a panel for hiding the hard disk apparatus 13. It is to be noted that, in the electronic apparatus 1 of the present example, the upper housing 21 and the lower housing 29 are secured to each other by a screw 41 as shown in FIG. 9.

As shown in FIG. 8, the upper part 1A of the electronic apparatus 1 has, on a right end portion thereof, a flange portion R which surrounds an outer peripheral edge of the side panel 31. The flange portion R of the present example is configured from a right edge 2b of the front panel 2, the right edge 10c of the slide cover 10, a right edge 3b of the rear panel 3 and a right edge 29a of the lower housing 29, and they surround the outer peripheral edge of the side panel 31 (refer to FIG. 3). The side panel 31 configures the upper part 1A of the electronic apparatus 1 and has an elliptical shape. The flange portion R has an elliptical annular shape. The flange portion R has an inclined face Ra. The inclined face Ra is inclined such that it is directed inwardly of the flange portion R (in a direction toward the axial line C1) and outwardly of the electronic apparatus in the leftward and rightward direction. Further, the inclined face Ra is formed over the overall periphery of the flange portion R. As shown in FIG. 9, a clearance is formed between the flange portion R and the outer peripheral edge of the side panel 31. In other words, the side panel 31 has a size a little smaller than that of the flange portion R. The inclined face Ra is positioned such that it overlaps with the outer peripheral edge of the side panel 31 as viewed in side elevation. Therefore, even if the side panel 31 is positionally displaced from the flange portion R, a situation that the inner panel portion 25 is observed through a gap originating from the positional displacement can be prevented. As a result, such gaps can be suppressed from standing out.

As shown in FIG. 9, the housing 20 has a vent hole 29c. The vent hole 29c is formed at a position hidden by the outer peripheral portion of the side panel 31. Consequently, while the appearance of the electronic apparatus 1 is prevented from being degraded by the vent hole 29c, an air flow F3 which passes through the clearance between the flange portion R and the outer peripheral edge of the side panel 31 and through the vent hole 29c can be formed. In the present example, the air flow F3 flows, by driving of the cooling fan described hereinabove, through the clearance between the flange portion R and the outer peripheral edge of the side panel 31 and through the vent hole 29c toward the inner side of the housing 20.

In the present example, a rib 29d positioned on the inner side of the side panel 31 is formed on an upper face of the lower housing 29 as shown in FIG. 9. The rib 29 in the present example extends from a front edge toward a rear edge of the lower housing 29 (refer to FIG. 8). A plurality of vent holes 29c juxtaposed in the extending direction of the rib 29 are formed in the rib 29. It is to be noted that the rib 29 in the present example is positioned on the inner side than the side inner panel portion 25 of the upper housing 21.

As shown in FIG. 8, the side panel 31 has an inclined face 31a on an outer peripheral edge thereof. As shown in FIG. 9, the inclined face 31a is opposed to the inclined face Ra of the flange portion R. In particular, the inclined face 31a is directed such that it is directed to the housing 20 and besides directed outwardly of the outer peripheral edge of the side panel 31. Between the inclined face 31a of the side panel 31 and the inclined face Ra of the flange portion R, an airflow path extending substantially linearly toward the vent hole 29c is formed. As a result, smoothing of the air flow F3 can be anticipated.

It is to be noted that, while the structure of the right side portion of the electronic apparatus 1 is described here with reference to FIGS. 8 and 9, the inner panel portion 25 of the upper housing 21 and the vent hole 29c of the lower housing 29 are formed also on the left side portion of the electronic apparatus 1.

As shown in FIG. 8, the side panel 31 has a plurality of (in the present example, seven) engaging portions 31d on a face thereof opposed to the side inner panel portion 25. On the other hand, the side inner panel portion 25 has engaged portions 25a which are engaged by the engaging portions 31d. In the present example, end portions of the plural engaging portions 31d are bent in the same direction (in the present example, in the front direction). Therefore, in an attaching operation of the side panel 31, if the side panel 31 is disposed in parallel to the side inner panel portion 25 and then moved forwardly, then the engaging portions 31d of the side panel 31 can be engaged with the engaged portions 25a of the side inner panel portion 25. Further, the side panel 31 has a projection 31e. Meanwhile, a rib 25b is formed on the side inner panel portion 25. In the attaching operation of the side panel 31, when the side panel 31 is moved forwardly, the projection 31e moves forwardly over the rib 25b. As a result, the side panel 31 can be prevented from being removed without an intention of the user. It is to be noted that, in order to make it easier for the projection 31e to move over the rib 25b, the projection 31e has an inclined face on an outer face thereof (face to be contacted with the rib 25b).

As described hereinabove, the slide cover 10 is curved such that the position of a central portion thereof in the front and rear direction is higher than those of the front edge and the rear edge thereof. The disk accommodation section 22a in which an optical disk is to be disposed is covered with the slide cover 10 positioned at the closed position. The rotational driving portion 7a for being fitted in the center hole of an optical disk to rotate the optical disk is provided on the disk accommodation section 22a. With the present structure, since a loading mechanism for transporting an optical disk to the electronic apparatus is not required, reduction of the cost can be anticipated. Further, since the height of the rotational driving portion 7a can be increased, the installation operation of an optical disk into the disk accommodation section 22a can be facilitated.

Further, the slide cover 10 is slidably movable between the front panel 2 provided on one side (in the example described above, on the front side) of the slide cover 10 and the rear panel 3 provided on the other side (in the example described above, on the rear side) of the slide cover 10. Further, on the upper face of the electronic apparatus 1, the guide portion 22e formed along the front panel 2 for guiding the slide cover 10 and the guide portion 22f formed along the rear panel 3 for guiding the slide cover 10 are provided. With the present structure, when the user looks at the electronic apparatus 1, the guide portions 22e and 22f can be prevented from standing out.

Further, the electronic apparatus 1 includes the front panel 2 which configures a front portion of the upper face thereof and the rear panel 3 which configures a rear portion of the upper face thereof, and the slide cover 10 slidably moves in the leftward and rightward direction between the front panel 2 and the rear panel 3. With the present structure, when the user moves the slide cover 10, the posture of the electronic apparatus can be prevented from changing.

The front panel 2 and the slide cover 10 are disposed so as to be in flush with each other, and the front panel 2 has, on the rear edge thereof, the inclined face 2a directed obliquely rearwardly and downwardly. With the present structure, the gap between the rear edge of the front panel 2 and the upper housing 21 can be prevented from standing out.

The rear panel 3 and the slide cover 10 are disposed so as to be in flush with each other, and the rear panel 3 has, on the front edge thereof, the inclined face 3a directed obliquely forwardly and downwardly. With the present structure, the gap between the front edge of the rear panel 3 and the upper housing 21 can be prevented from standing out.

The upper face of the electronic apparatus 1 is curved such that a central portion thereof in the front and rear direction is positioned higher than the front edge 1b and the rear edge 1c thereof. Further, the electronic apparatus 1 includes the front panel 2 which is positioned in front of the slide cover 10 and which configures the curved upper face of the electronic apparatus 1 together with the slide cover 10, and the housing 20 which has the front inner panel portion 26 having the upper face to which the front panel 2 is attached. Further, the front inner panel portion 26 is curved in accordance with the front panel 2. With the present structure, the front portion of the electronic apparatus 1 has a dual structure, and the strength of the front portion can be increased.

The housing 20 includes the upper panel section 22 on the upper side of which the slide cover 10 is disposed. The front inner panel portion 26 extends forwardly from the upper panel section 22. A gap is formed between the front edge of the upper panel section 22 and the rear edge of the front panel 2, and the front inner panel portion 26 includes the portion (rear portion 26a) which has a gap from the front panel 2. The vent holes 26b connected to the inner side of the housing 20 are formed in the rear portion 26a of the front inner panel portion 26. With the structure, since the vent holes 26b are covered with the front panel 2, while the outer appearance of the electronic apparatus 1 is prevented from being degraded by the presence of the vent holes 26b, it is possible to cause the gap between the front edge of the upper panel section 22 and the rear edge of the front panel 2 to function as an airflow path.

The electronic apparatus 1 includes the housing 20 which has the rear inner panel portion 27 having the upper face to which the rear panel 3 is attached. The rear inner panel portion 27 is curved in accordance with the rear panel 3. With the present structure, the rear portion of the electronic apparatus 1 has a dual structure, and the strength of the rear portion can be increased.

The housing 20 includes the upper panel section 22 on the upper side of which the slide cover 10 is disposed, and the rear inner panel portion 27 extends rearwardly from the upper panel section 22. A gap is formed between the rear edge of the upper panel section 22 and the front edge of the rear panel 3, and the rear inner panel portion 27 includes the portion (front portion 27*a*) which has a gap from the rear panel 3. The vent holes 27*b* connected to the inner side of the housing 20 are formed in the front portion 27*a* of the rear inner panel portion 27. With the structure, the outer appearance of the electronic apparatus 1 can be prevented from being degraded by the presence of the vent holes 27*b*.

The upper panel section 22 positioned between the front panel 2 and the rear panel 3 is provided. The upper panel section 22 has the second side portion 22B in the form of a plate which is covered with the slide cover 10 when the slide cover 10 is at the open position and which is curved in accordance with the slide cover 10. The plural grooves 22*g* extending in the leftward and rightward direction are formed on the upper face of the second side portion 22B. With the structure, even if a trace by movement of the slide cover 10 is formed on the upper face of the second side portion 22B, the trace can be prevented from standing out.

It is to be noted that the present invention is not limited to the electronic apparatus 1 described hereinabove but may be modified in various manners.

For example, the grooves 10*e* formed on the slide cover 10 and the grooves 22*g* formed on the upper panel section 22 may not necessarily be provided.

Further, the side panel 31 may not necessarily be provided. In this instance, a portion which configures a side face of the electronic apparatus 1 may be provided on the upper housing 21 or the lower housing 29.

In the electronic apparatus 1, the guided portions 11*a* and 11*b* of the slide cover 10 are configured so as to take hold of the front edge and the rear edge of the upper panel section 22, respectively. However, the attachment structure of the slide cover 10 is not necessarily limited to this. For example, the guided portions 11*a* and 11*b* of the slide cover 10 may project forwardly and rearwardly, respectively. Further, the guided portions 11*a* and 11*b* may be hooked by the front panel 2 and the rear panel 3 to attach the slide cover 10 to the electronic apparatus 1.

Further, the upper face of the electronic apparatus 1 may not be curved so as to configure the outer peripheral face of an elliptical cylinder but may be curved so as to configure part of the outer peripheral face of a cylinder.

The slide cover 10 may be movable to a position farther than the end portion (in the example described above, the left end portion) of the electronic apparatus 1.

Further, both or one of the front panel 2 and the rear panel 3 may not necessarily be provided. In this instance, the upper housing 21 may configure, at a front portion (namely, the front inner panel portion 26) or a rear portion (namely, the rear inner panel portion 27) thereof, the upper face of the electronic apparatus 1.

Further, the front bars 8 and 9 provided at the frontmost portion of the electronic apparatus 1 may not necessarily be provided.

The invention claimed is:

1. An electronic apparatus, comprising:
    an upper face curved over a range from a front edge to a rear edge of the upper face such that a central portion of the upper face in a front and rear direction is positioned higher than the front edge and the rear edge;
    a slide cover which configures part of the upper face, the slide cover being curved in accordance with the upper face such that a central portion of the cover in the front and rear direction is positioned higher than a front edge and a rear edge of the cover, the slide cover being slidably movable between an open position and a closed position;
    a disk accommodation section covered with the slide cover which is at the closed position and configured such that an optical disk is disposed therein;
    a rotational driving portion provided on the disk accommodation section and configured to be fitted in a center hole of the optical disk to rotate the optical disk;
    a front panel which configures a front portion of the upper face of the electronic apparatus; and
    a rear panel which configures a rear portion of the upper face of the electronic apparatus;
    the slide cover being slidably movable in a leftward and rightward direction between the front panel and the rear panel.

2. The electronic apparatus according to claim 1,
    wherein the slide cover is slidably movable between a first panel provided on one side of the slide cover and a second panel provided on the other side of the slide cover, and
    the upper face of the electronic apparatus is provided thereon with a first guide portion which is formed along the first panel and configured to guide the slide cover and a second guide portion which is formed along the second panel and configured to guide the slide cover.

3. The electronic apparatus according to claim 1,
    wherein the front panel and the slide cover are disposed so as to be in flush with each other, and
    the front panel has, on a rear edge of the front panel, an inclined face which is directed obliquely rearwardly and downwardly.

4. The electronic apparatus according to claim 1,
    wherein the rear panel and the slide cover are disposed so as to be in flush with each other, and
    the rear panel has, on a front edge of the rear panel, an inclined face which is directed obliquely forwardly and downwardly.

5. The electronic apparatus according to claim 1, further comprising:
    the front panel positioned forwardly of the slide cover and configuring the curved upper face of the electronic apparatus together with the slide cover; and
    a housing having a front inner panel portion having an upper face to which the front panel is attached;
    the front inner panel portion being curved in accordance with the front panel.

6. The electronic apparatus according to claim 5,
    wherein the housing includes an upper panel section on the upper side of which the slide cover is disposed,
    the front inner panel portion extends forwardly from the upper panel section,
    a gap is formed between a front edge of the upper panel section and a rear edge of the front panel,
    the front inner panel portion includes a portion which has a gap from the front panel, and
    a vent hole connected to the inner side of the housing is formed in the portion of the front inner panel portion.

7. The electronic apparatus according to claim 1, further comprising:

the rear panel positioned rearwardly of the slide cover and configuring the curved upper face of the electronic apparatus together with the slide cover; and a housing having a rear inner panel portion which has an upper face to which the rear panel is attached;

the rear inner panel portion being curved in accordance with the rear panel.

8. The electronic apparatus according to claim 7, wherein the housing further includes an upper panel section on the upper side of which the slide cover is disposed, the rear inner panel portion extends rearwardly from the upper panel section, a gap is formed between a rear edge of the upper panel section and a front edge of the rear panel, the rear inner panel portion includes a portion which has a gap from the rear panel, and a vent hole connected to the inner side of the housing is formed at the portion of the rear inner panel portion.

9. The electronic apparatus according to claim 1, wherein the electronic apparatus further comprises an upper panel section positioned between the front panel and the rear panel, the upper panel section has a side portion in the form of a plate which is covered with the slide cover when the slide cover is at the open position and which is curved in accordance with the slide cover, and a plurality of grooves extending in the leftward and rightward direction are formed on an upper face of the side portion.

10. The electronic apparatus according to claim 1, wherein each of the front panel and the rear panel is curved in accordance with the upper face of the electronic apparatus.

* * * * *